(12) United States Patent
Kim (10) Patent No.: US 9,187,856 B2
(45) Date of Patent: Nov. 17, 2015

(54) WASHING MACHINE AND WASHING METHOD

(75) Inventor: Youngjong Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1164 days.

(21) Appl. No.: 12/841,614

(22) Filed: Jul. 22, 2010

(65) Prior Publication Data

US 2011/0016638 A1    Jan. 27, 2011

(30) Foreign Application Priority Data

Jul. 23, 2009 (KR) .................. 10-2009-0067373

(51) Int. Cl.
| | |
|---|---|
| *D06F 37/20* | (2006.01) |
| *D06F 35/00* | (2006.01) |
| *D06F 37/40* | (2006.01) |
| *D06L 1/16* | (2006.01) |
| *D06L 1/20* | (2006.01) |

(52) U.S. Cl.
CPC .............. *D06F 35/006* (2013.01); *D06F 37/40* (2013.01); *D06L 1/16* (2013.01); *D06L 1/20* (2013.01); *D06F 2202/10* (2013.01); *D06F 2204/06* (2013.01); *D06F 2222/00* (2013.01); *Y02B 40/56* (2013.01)

(58) Field of Classification Search
CPC .................................................... D06F 35/006
See application file for complete search history.

(56) References Cited

U.S. PATENT DOCUMENTS

| | | | | |
|---|---|---|---|---|
| 7,530,132 | B2 * | 5/2009 | Kim .................................. | 8/158 |
| 2008/0256722 | A1 * | 10/2008 | Oberkirsch et al. .............. | 8/159 |
| 2009/0094761 | A1 * | 4/2009 | Lee et al. .......................... | 8/159 |

* cited by examiner

*Primary Examiner* — Jason Ko
(74) *Attorney, Agent, or Firm* — Birch, Stewart, Kolasch & Birch, LLP (57) ABSTRACT

In a washing machine according to the present invention, if a washing step is ended, a distribution step that the inner tub containing the washing water is rotated in one direction and fabrics is distributed to a side wall of the inner tub and the washing water is discharged to outside is performed. Because a fabric is evenly distributed in the distribution step, a dehydration step can be performed without carrying out a separate procedure for avoiding unbalance. Therefore, energy such as washing time and power used during the operation of the washing machine and amount of water used can be saved. Also, since a washing machine according to the present invention rotates the inner tub not only during the distribution step but also during the hydration step afterwards, operation of a clutch used to selectively rotate the pulsator and the inner tub at the time of entering to the dehydration step from the distribution step is not required. Therefore, noise due to the operation of a clutch can be reduced and operation time of the washing machine can be reduced.

6 Claims, 6 Drawing Sheets

WASHING MACHINE AND WASHING METHOD

BACKGROUND OF THE INVENTION

1. Field of the Invention

The present invention relates to a washing machine and a control method of the same. More specifically, the present invention relates to a washing machine and a washing method capable of reducing amount of water used and washing time.

2. Description of the Conventional Art

In general, a washing machine is a device which removes debris of fabric and handles laundry. The washing machine removes debris of fabric in various ways. The washing machine, after removing debris of laundry, performs a step for removing moisture in the laundry. At this time, washing water contained in an inner tub is discharged to the outside. When washing water of the washing machine is discharged to the outside, the washing machine measures the degree of unbalance of the inner tub. If it is found that unbalance of the inner tub exists, the washing machine provides a small amount of washing water to the inner tub. Due to the washing water provided, fabric is made to flow inside the inner tub. At this time, the washing machine again measures the degree of unbalance of the inner tub. The procedure above is repeated until the unbalance of the inner tub is removed. Once unbalance of the inner tub is removed, a driving apparatus removes moisture of fabric by accelerating the inner tub.

However, a washing machine according to the related art repeats the above procedure, leading to excessive consumption of washing water and energy.

SUMMARY OF THE INVENTION

An object of the present invention is to provide a washing machine capable of reducing amount of water used and energy.

A washing method according to the present invention comprises a washing step that at least one of an inner tub and a pulsator is rotated for washing fabrics; a distribution step that the inner tub containing the washing water is rotated in one direction and fabrics is distributed to a side wall of the inner tub and the washing water is discharged to outside; and a dehydration step that the inner tub is rotated by the dehydration rotation speed for dehydrating fabrics after the distribution step is ended.

In the present invention, the washing step comprises a first washing step that the inner tub is rotated in one direction with a first rotation speed so as to form a circulation water flow which is risen between the inner tub and an outer tub by the centrifugal force and then is fed back to the inner tub, and a second washing step that at least one of the inner tub and the pulsator is rotated in both directions alternately with a second rotation speed different from the first rotation speed.

In the present invention, the distribution step includes that washing water is discharged by turning on a discharge pump, and the first washing step includes that washing water is not discharged by turning off the discharge pump.

In the present invention, the first washing and the second washing are repeated multiple times.

In the present invention, the distribution step is performed for a predetermined time and the dehydration step is performed after the predetermined time.

In the present invention, the distribution step is completed, unbalance detection step for detecting unbalance of fabrics is performed.

In the present invention, if fabric is found unbalanced in the unbalance detection step, the distribution step is performed again.

In the present invention, if fabric is found not unbalanced in the unbalance detection step, the dehydration step is performed.

In the present invention, further including the balancing step where washing water contained in an inner tub is rotated by rotating at least one of the inner tub and the pulsator.

In the present invention, the balancing step is performed between the washing step and the distribution step.

In the present invention, when the distribution step is completed, unbalance detection step for detecting unbalance of fabric is performed.

In the present invention, if fabric is found unbalanced in the unbalance detection step, the distribution step is performed again.

In the present invention, if fabric is found not unbalanced in the unbalance detection step, the dehydration step is performed.

A washing machine according to the present invention comprises an inner tub; a pulsator disposed inside the inner tub; a discharge apparatus for discharging washing water of the inner tub outside; a driving apparatus for driving the inner tub and the pulsator; and a controller for controlling the discharge apparatus to discharge washing water and controlling the driving apparatus to rotate the inner tub in one direction.

In a washing machine according to the present invention, if a washing step is ended, a distribution step that the inner tub containing the washing water is rotated in one direction and fabrics is distributed to a side wall of the inner tub and the washing water is discharged to outside is performed. Because a fabric is evenly distributed in the distribution step, a dehydration step can be performed without carrying out a separate procedure for avoiding unbalance. Therefore, energy such as washing time and power used during the operation of the washing machine and amount of water used can be saved. Also, since a washing machine according to the present invention rotates the inner tub not only during the distribution step but also during the hydration step afterwards, operation of a clutch used to selectively rotate the pulsator and the inner tub at the time of entering to the dehydration step from the distribution step is not required. Therefore, noise due to the operation of a clutch can be reduced and operation time of the washing machine can be reduced.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
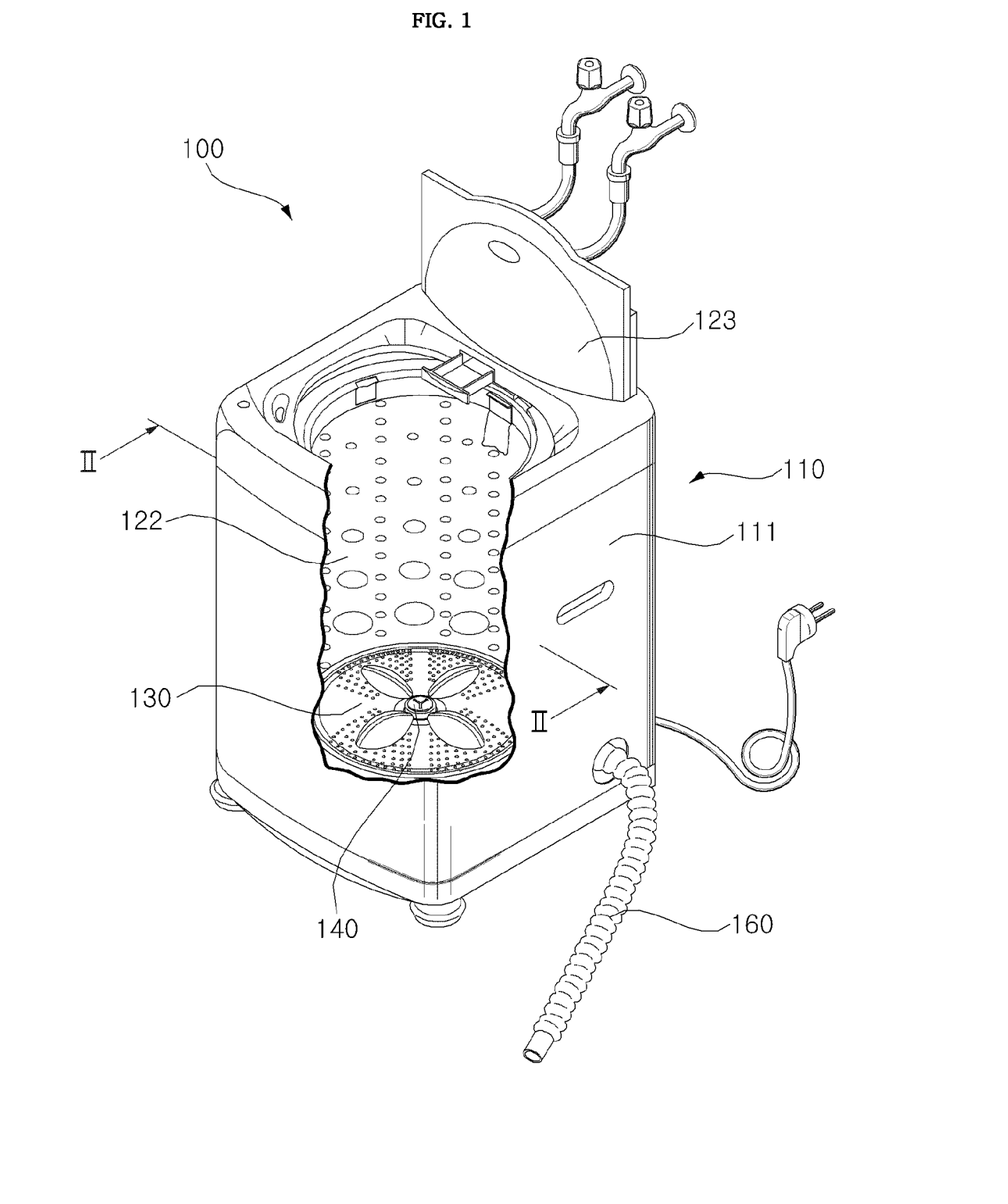
FIG. 1 is a perspective view of one embodiment of a washing machine according to the present invention.
Figure 2:
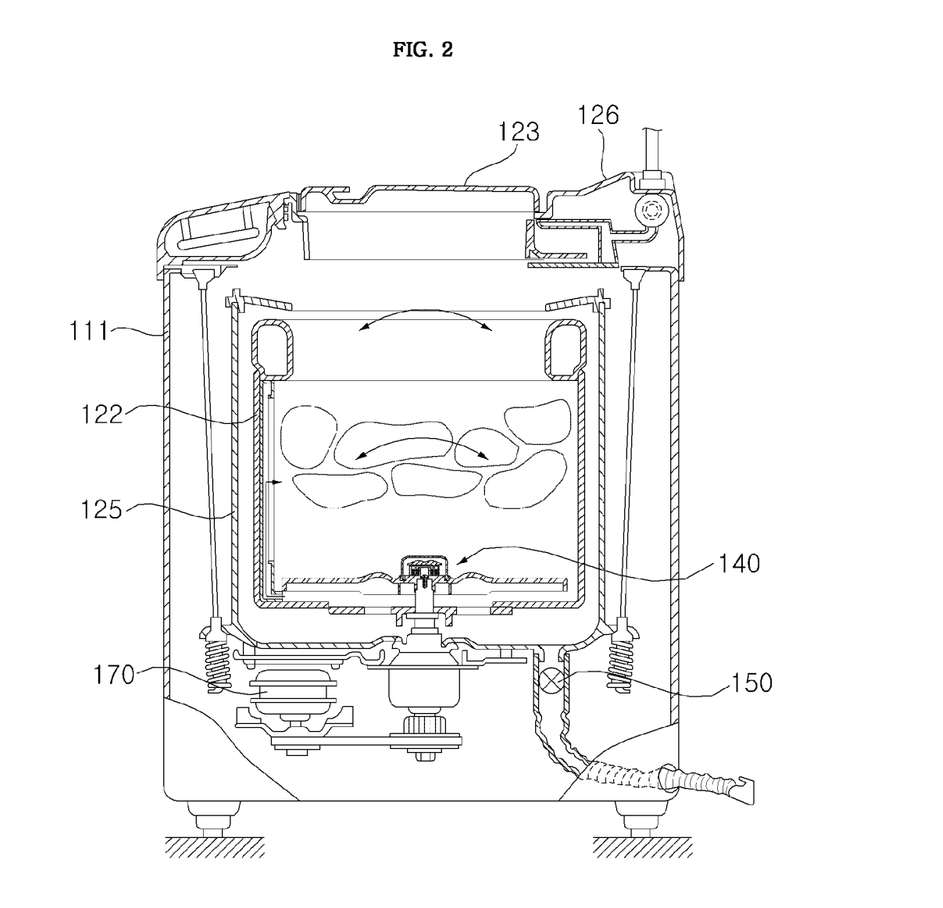
FIG. 2 illustrates a cross sectional view of FIG. 1 as seen along II-II line.

FIG. 1 is a perspective view of one embodiment of a washing machine according to the present invention and FIG. 2 illustrates a cross sectional view of FIG. 1 as seen along II-II line.

With reference to FIGS. 1 and 2, a washing machine 100 according to the present invention comprises a cabinet 110; a outer tub 125 disposed inside the cabinet 110 and storing washing water; an inner tub 122 disposed inside the outer tub 125 and receiving laundry; a driving apparatus 170 rotating the inner tub 122 in both directions alternately or in one direction by delivering driving force to the inner tub 122; a discharge apparatus 150 discharging washing water of the outer tub to the outside; and a washing water provision apparatus 120 disposed in one side of the cabinet 110 and providing washing water from the outside to the outer tub 125 and the inner tub 122.

A pulsator 140 is disposed in the bottom surface of the inner tub 122. The pulsator 140 can be formed as a single body with the inner tub 122; and at the same time, the pulsator 140 can be formed separately and combined as such therewith. An operation method varied according to the structure of the inner tub 122 and the pulsator 140 will be described in detail later.

The cabinet 110 comprises a cabinet main body 111 having an opening; a base (not shown) disposed in a lower side of the cabinet main body 111 and fastened to the cabinet main body 111; a cover (not shown) fastened to the opening; and a control panel 126 formed on one side of the cover and fastened to the cabinet main body 111. A door 123 capable of rotational movement together with the cover is installed at the cover to open and close the opening. Meanwhile, the control panel 126 incorporates an input unit 116 which receives input signals from a user.

The driving apparatus 170 comprises a motor including a rotor and a stator and generating rotational force; a rotation axis delivering rotational force of the motor; and a clutch delivering rotational force of the motor selectively to at least one of the inner tub and the pulsator 140.

Figure 3:
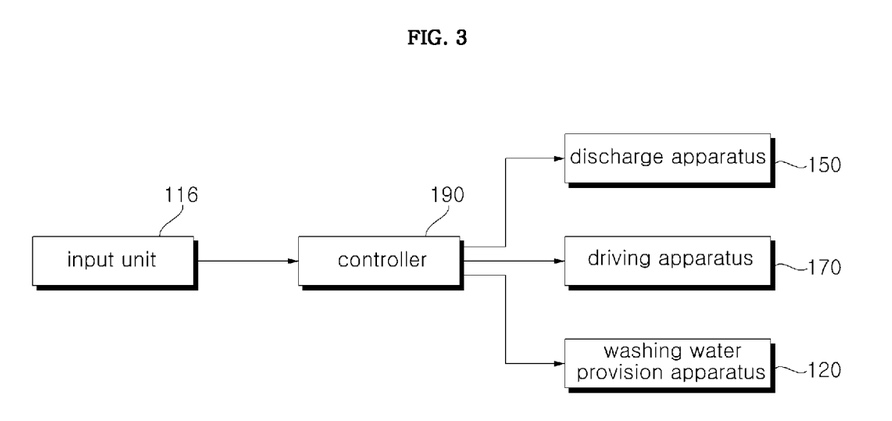
FIG. 3 illustrates a block diagram of a control flow of a washing machine of FIG. 1.

FIG. 3 illustrates a block diagram of a control flow of a washing machine 100 of FIG. 1.

With reference to FIG. 3, a washing machine 100 according to the present invention further comprises an input unit 116 disposed on the control panel and receiving input signals entered by the user; and a controller 190 controlling the operation of the washing machine 100 according to the input signals entered to the input unit 116.

The input signal is formed in various ways and determines a washing step or a method for handling laundry. For example, the washing step can include a blue jean step, a bedclothes step, and a wool step. Also, the treatment method of fabric can include a washing method, a dehydration method, and a rinsing method.

When the user enters the input signal, the washing machine 100 performs a washing step. In the washing step, the controller 190 makes washing water flow into the inner tub 122 by operating the washing water provision apparatus 120.

When the washing water provision apparatus 120 begins to operate, washing water is provided to the inner tub 122 from the outside.

Figure 4:
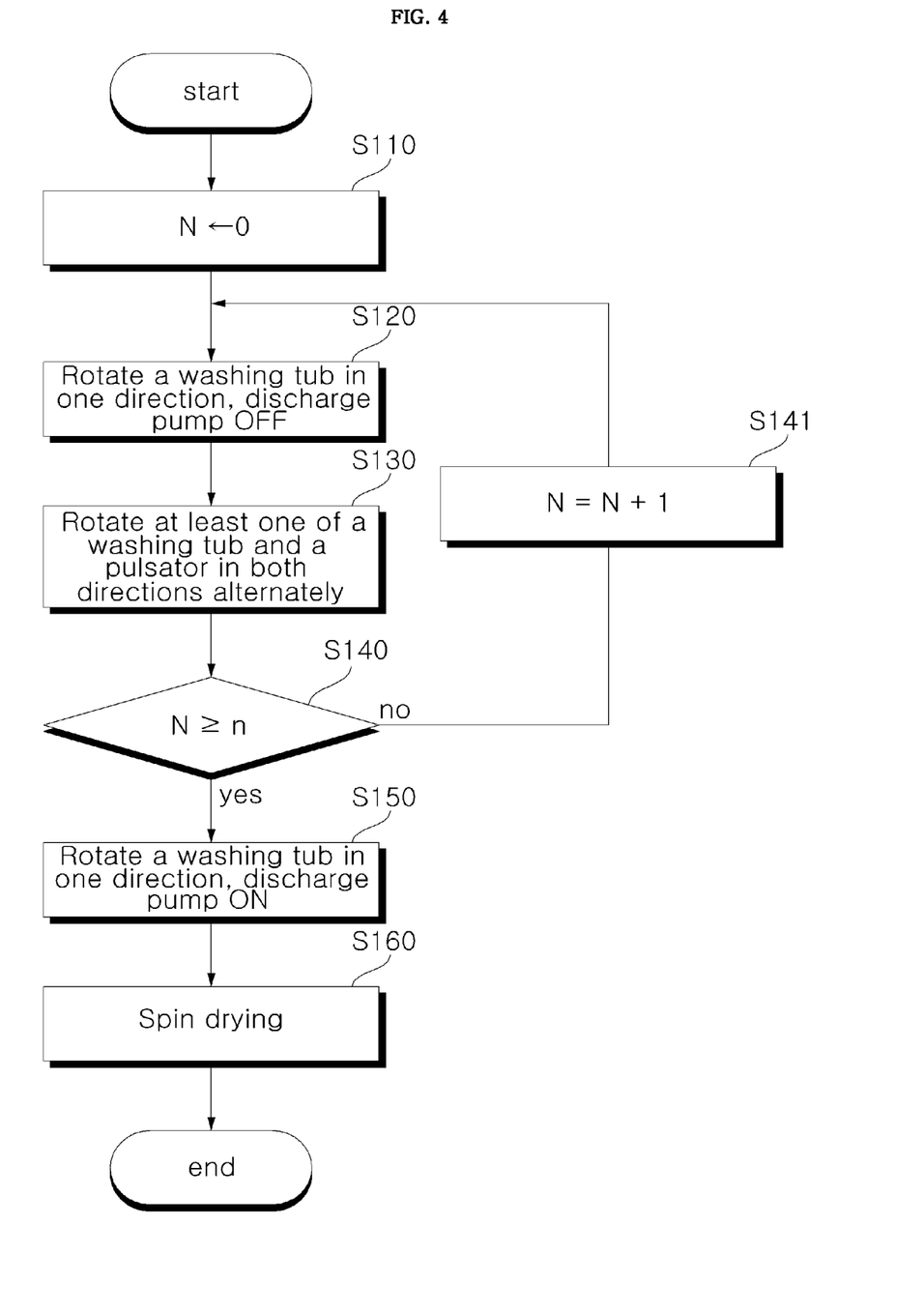
FIG. 4 illustrates a flow diagram of a washing method of a washing machine according to a first embodiment of the present invention.

FIG. 4 illustrates a flow diagram of a washing method of a washing machine according to a first embodiment of the present invention.

With reference to FIG. 4, when provision of the washing water is completed, the controller 190 performs a washing step, removing dirt of fabric while controlling the operation of the driving apparatus 170.

According to a control method of the driving apparatus 170, the washing step can be classified as described below. The washing step can include a first washing step S120 forming a circulating water flow fed back to the inner tub after washing water has risen in between the inner tub 122 and the outer tub 125 due to centrifugal force developed as the inner tub 122 is rotated in one direction with a first rotation speed; and a second washing step S130 rotating at least one of the inner tub 122 and the pulsator 140 in both directions alternately with a second rotation speed different from the first rotation speed.

In the first washing step S120, the driving apparatus 170 rotates the inner tub 122 in one direction with the first rotation speed. By centrifugal force generated by accelerated rotation of the inner tub 122 in one direction, a part of fabric put inside the inner tub 122 can be distributed being adhered closely to the inner wall of the inner tub 122 together with washing water. At this time, washing water can make an inclination with a predetermined angle with respect to the inner wall of the inner tub 122. In other words, the washing water can be so formed that width from the inner wall of the inner tub 122 is thicker in a lower part than that in an upper part.

Also, the washing water flows out to the outer tub 125 through a plurality of holes formed in the inner tub 122. If the inner tub 122 continues to rotate, washing water moves from a space between the inner tub 122 and the outer tub 125 to the upper side. Washing water which has moved to the upper side of the outer tub 125 runs into the tub cover disposed in the upper side of the outer tub 125 and then drops into the inside of the inner tub 122. Washing water dropping into the inside of the inner tub 122 runs into laundry; fabric is washed being forced from dropping washing water. At this time, the first rotation speed can be set to exceed a second rotation speed described later S120.

Meanwhile, in the second washing step S130, the driving apparatus 170 can rotate at least one of the pulsator 140 and the inner tub 122 in both directions alternately with a second rotation speed different from the first rotation speed.

At this time, when the pulsator 140 and the inner tub 122 are combined together being formed separately, the controller 190, by controlling the operation of the clutch (not shown), can rotate selectively at least one of the pulsator 140 and the inner tub 122 in a predetermined direction. The driving apparatus 170 can rotate the pulsator 140 and the inner tub 122 in different directions from each other. At least one of the pulsator 140 and the inner tub 122 can be rotated in clockwise direction and then in counter clockwise direction after a predetermined time. Also, the driving apparatus 170 can rotate the other one from the pulsator 140 and the inner tub 122 in counter clockwise direction and then again in clockwise direction after a predetermined time. In case the pulsator 140 rotates, washing water inside the inner tub 122 can form a water flow due to the pulsator 140. Due to the water flow, washing water flows and produces friction against laundry; and fabric can be washed owing to the friction.

Meanwhile, in case the pulsator 140 and the inner tub 122 are formed as a single body, the controller 190, while rotating the inner tub 122 with the second rotation speed, can control the driving apparatus 170 to rotate in both directions alternately. When the inner tub 122 rotates, the pulsator 140 can rotate in the same direction as the inner tub 122. During the rotation of the inner tub 122, washing water does not move to the upper side of the outer tub 125. When the inner tub 122 repeats rotation in both directions, washing water can form a water flow inside the inner tub 122. Washing water inside the outer tub 125 rotates according to the rotation direction of the inner tub 122. Fabric can be washed as washing water and fabric are rotated in the same direction as that of the inner tub 122, S130.

At the time, the first washing step S120 and the second washing S130 are performed alternately, performing order thereof being allowed to be changed.

Meanwhile, after a predetermined time, the controller 190 measures a number N of performance of the first washing step S120 and the second washing step S130. S140

When the number N is less than a predetermined number n, the controller 190 adds one to the number N of performance of the washing steps S141.

Then, the controller 190 repeats performing the first washing step S120 and the second washing step S130 sequentially.

If the number N of performance of the washing steps is determined to be more than the predetermined number n, the controller 190 terminates the steps. In other words, the controller 190 terminates the washing step.

When the washing step is terminated, the controller 190 performs a distribution step S150. In the distribution step S150, the controller 190 rotates the inner tub 122 in one direction by controlling the driving apparatus 170 while washing water is contained in the inner tub 122. Fabric inside the inner tub 122 can be distributed across a side wall of the inner tub 122 by centrifugal force developed by rotation of the inner tub 122 in one direction. Also, the controller 190 operates a discharge pump of a discharge apparatus 150 to discharge washing water of the inner tub 122 to the outside. At this time, the controller 190 can operate the discharge pump not only after the inner tub 122 has been rotated in one direction for a predetermined time but also while the inner tub 122 is being rotated in one direction.

As fabrics distributed across a side wall of the inner tub 122 and washing water is discharged to the outside by the operation of the discharge apparatus 150, unbalance of the inner tub 122 can be minimized. Also, moisture of fabric can be removed quickly. Moreover, since washing water is not provided to compensate unbalance of the inner tub 122, amount of water used can be reduced. S150

When the distribution step S150 is terminated, the controller 190, by accelerated rotation of the inner tub 122 with a dehydration speed, performs dehydration step to remove moisture of fabric S160.

At this time, since the inner tub 122 has been made to rotate in the distribution step S150 before the dehydration step S160, accelerated rotation of the inner tub 122 can be possible without a operation of the clutch in the dehydration step S160. Therefore, noise due to the operation of the clutch, operation time, and energy can be reduced.

Since additional washing water is not provided to accommodate unbalance of the inner tub 122 before entering into the dehydration step S160, not only amount of water used can be reduced but also amount of washing water to be drained during the dehydration step S160 is reduced; therefore, an advantageous effect can be obtained that dehydration time can be reduced.

Figure 5:
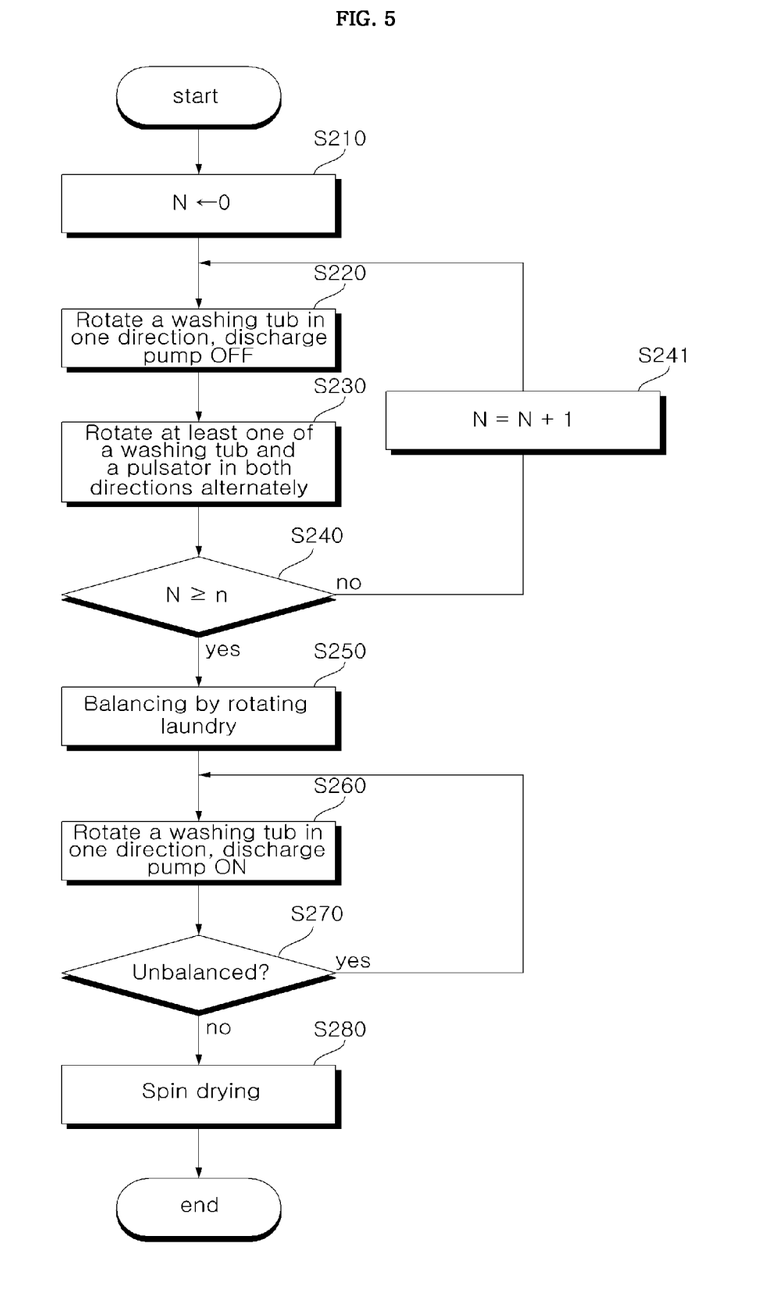
FIG. 5 illustrates a flow diagram of a washing method of a washing machine according to a second embodiment of the present invention.

FIG. 5 illustrates a flow diagram of a washing method of a washing machine according to a second embodiment of the present invention.

With reference to FIG. 5, a washing method of a washing machine according to a second embodiment of the present invention is described.

First, after washing water is supplied, the controller 190 performs washing which removes dirt of fabric while controlling the operation of the driving apparatus 170.

The washing includes a first washing S220 which rotates the inner tub 122 in one direction and a second washing S230 which rotates at least one of the inner tub 122 and the pulsator 140 in both directions alternately. Since detailed description thereof is the same as in the first embodiment, description associated therewith is not provided further.

Meanwhile, after a predetermined time is passed, the controller 190 measures a number N of performance of the first washing step S220 and the second washing step S230. S240.

When the number N is less than a predetermined number n, the controller 190 adds one to the number N of performance of the washing step S241.

Then, the controller 190 repeats performing the first washing step S220 and the second washing step S230 sequentially.

If the number N of performance of the washing step is determined to be more than the predetermined number n, the controller 190 terminates the steps. In other words, the controller 190 terminates the washing step.

After the washing is completed, the controller 190 performs a balancing step S250 to form a rotating water flow of washing water. At this time, washing water is rotated by rotating at least one of the inner tub 122 and the pulsator 140 selectively. In the balancing step S250, employed is rotation speed slower than that in the washing or distribution step S260 described later.

After performance of the balancing step S250 for a predetermined time, distribution step S260 is performed. Both the distribution step S260 and the balancing step S250 aim to remove unbalance by distributing laundry; the two steps are different by rotation speed, washing water flow, and discharge state.

In other words, the distribution step S260 makes fabric adhere closely to a side wall of the inner tub 122 by centrifugal force developed by rotation of the inner tub 122 with higher speed than in the balancing step S250. At this time, the controller rotates the inner tub 122 while washing water is contained in the inner tub 122. And since a discharge pump of the discharge apparatus 150 is turned on in the distribution step, washing water of the inner tub 122 is discharged to the outer tub 125 through the holes of the discharge apparatus 150, helping fabric adhere to the inner wall of the inner tub 122. As fabric is distributed across a side wall of the inner tub 122 and washing water is discharged to the outside by the operation of the discharge apparatus 150, unbalance of the inner tub 122 can be minimized. Also, moisture of fabric can be removed quickly. Moreover, since washing water is not provided to compensate unbalance of the inner tub 122, amount of water used can be reduced.

When the distribution step S260 is completed, the controller 190 determines the degree of unbalance of the inner tub 122, S270.

If it is found that unbalance of the inner tub exists, the controller 190 performs the distribution step S260 again. At this time, even if unbalance is detected, the controller 190 does not provide additional water supply.

If it is determined that unbalance of the inner tub 122 does not exist, the controller 190 performs dehydration step S280 which removes moisture of fabric by accelerated rotation of the inner tub 122 with a dehydration speed.

At this time, because the inner tub 122 is rotated in the distribution step S260 before the dehydration step S280, accelerated rotation of the inner tub 122 can be possible without the operation of the clutch in the dehydration step S280. Therefore, noise due to the operation of the clutch, operation time, and energy can be reduced.

Since additional washing water is not provided to accommodate unbalance of the inner tub 122 before entering into the dehydration step S160, not only amount of water used can be reduced but also amount of washing water to be drained during the dehydration step S160 is reduced; therefore, an advantageous effect can be obtained that dehydration time can be reduced.

A washing method of a washing machine according to a second embodiment of the present invention can minimize unbalance of the inner tub 122 by repeating the distribution step S260 according to the existence of unbalance of the inner tub 122, thereby improving the user satisfaction owing to the improvement of quietness at the time of spin drying.

Figure 6:
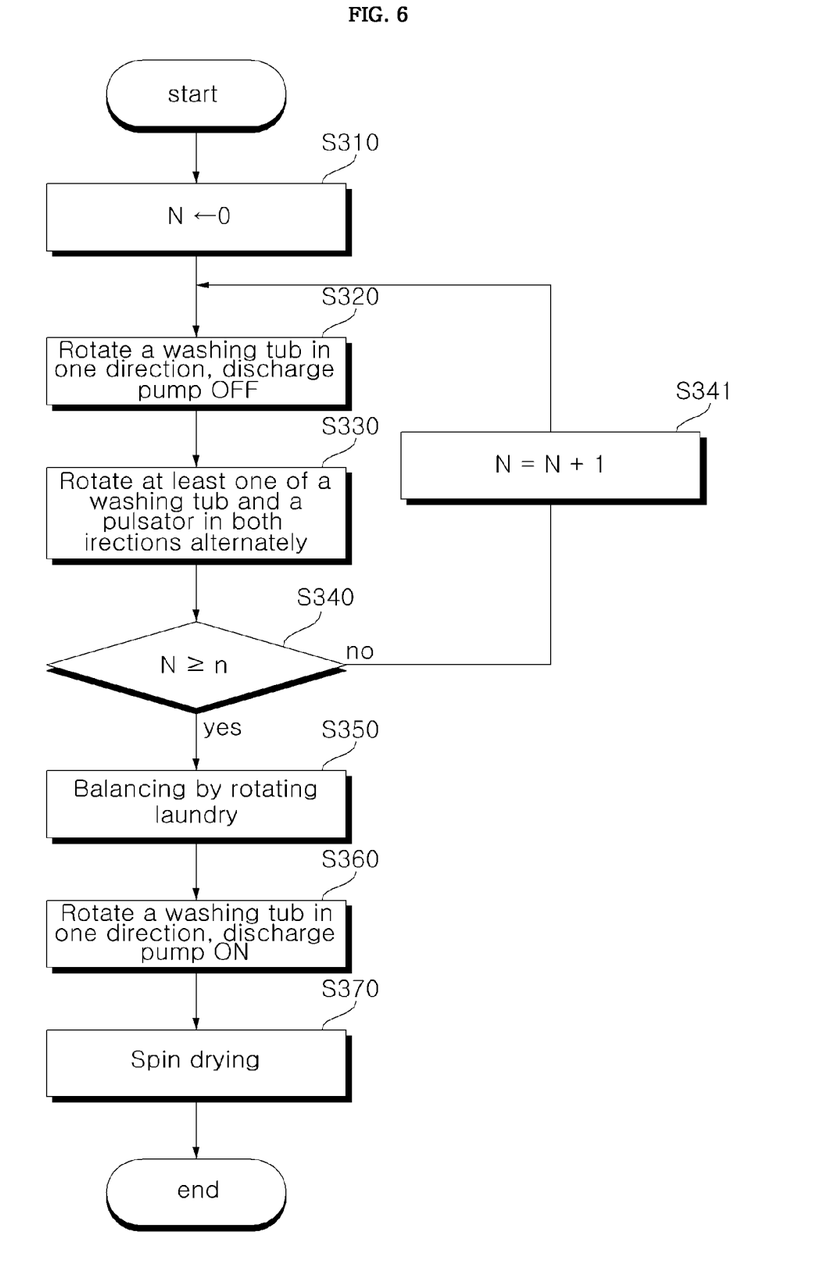
FIG. 6 illustrates a flow diagram of a washing method of a washing machine according to a third embodiment of the present invention.

FIG. 6 illustrates a flow diagram of a washing method of a washing machine according to a third embodiment of the present invention.

With reference to FIG. 6, a washing method of a washing machine according to a third embodiment of the present invention is described.

First, after washing water is supplied, the controller 190 performs washing which removes dirt of fabric while controlling the operation of the driving apparatus 170.

The washing includes a first washing step S320 which rotates the inner tub 122 in one direction and a second washing step S330 which rotates at least one of the inner tub 122 and the pulsator 140 in both directions alternately. Since detailed description thereof is the same as in the first embodiment, description associated therewith is not provided further.

Meanwhile, after a predetermined time is passed, the controller 190 measures a number N of performance of the first washing step S320 and the second washing step S330. S340.

When the number N is less than a predetermined number n, the controller 190 adds one to the number N of performance of the washing steps S341.

Then, the controller 190 repeats performing the first washing step S320 and the second washing step S330 sequentially.

If the number N of performance of the washing step is determined to be more than the predetermined number n, the controller 190 terminates the steps. In other words, the controller 190 terminates the washing step.

After the washing is completed, the controller 190 performs balancing step S350 to form a rotating water flow of washing water. Since the balancing step S350 is the same as in the second embodiment, description associated therewith is not provided further.

After performance of the balancing step S350 for a predetermined time, distribution step S360 is performed.

The distribution step S360 makes fabric adhere closely to a side wall of the inner tub 122 by centrifugal force developed by rotation of the inner tub 122 with higher speed than in the balancing step S350. Also, since a discharge pump of the discharge apparatus 150 is turned on in the distribution step, washing water of the inner tub 122 is discharged to the outer tub 125 through the holes of the discharge apparatus 150, helping fabric adhere to the inner wall of the inner tub 122. As fabric is distributed across a side wall of the inner tub 122 and washing water is discharged to the outside by the operation of the discharge apparatus 150, unbalance of the inner tub 122 can be minimized. Also, moisture of fabric can be removed quickly. Moreover, since washing water is not provided to compensate unbalance of the inner tub 122, amount of water used can be reduced.

When the distribution step S360 is completed, the controller 190 performs dehydration step S370 which removes moisture of fabric by accelerated rotation of the inner tub 122 with a dehydration step speed.

A washing method of a washing machine according to a third embodiment of the present invention, when the distribution step S360 is completed, does not determine the existence of unbalance and not readily enter into the dehydration step S370; therefore, operation time of a washing machine can be reduced.

It will be apparent to those skilled in the art that other specific embodiments of the invention can be made without departing from the spirit or modifying fundamental characteristics of the invention. Thus, it should be understood that the embodiments described above are provided as examples in all aspects and do not limit modifications and variations of the invention. The scope of the invention is specified by the appended claims rather than the detailed description given above. It should be interpreted that the spirit and the scope of the claims and all the modifications or variations derived from their equivalents belong to the scope of the invention.

What is claimed is:

1. A washing method comprising:
   adding washing water to an inner tub;
   performing a washing step where at least one of the inner tub and a pulsator is rotated such that fabrics are washed by washing water contained in the inner tub, wherein the washing step includes:
   performing a first washing step where the inner tub is rotated in one direction at a first rotation speed such that the washing water between the inner tub and an outer tub rises due to a centrifugal force and then drops into the inner tub to wash the fabrics; and
   performing a second washing step where at least one of the inner tub and the pulsator is rotated in both directions alternately at a second rotation speed slower than the first rotation speed such that friction is generated between the washing water and the fabrics to wash the fabrics;
   performing a balancing step where washing water contained in the inner tub is rotated by rotating the inner tub such that the fabrics are balanced in the inner tub;
   performing a distribution step where the inner tub containing the washing water of the washing step is rotated in one direction and the washing water is discharged to an outside of the inner tub such that the fabrics are distributed to a side wall of the inner tub, wherein a rotation speed of the inner tub during the distribution step is faster than a rotation speed of the inner tub during the balancing step; and
   performing a dehydration step where the inner tub is rotated at a dehydration rotation speed for dehydrating fabrics after the distribution step is ended,
   wherein the balancing step is performed without operation of a discharge pump.

2. The method of claim 1, wherein the distribution step includes that washing water is discharged by turning on the discharge pump, and the first washing step includes that washing water is not discharged by turning off the discharge pump.

3. The method of claim 1, wherein the first washing step and the second washing step are repeated multiple times.

4. The method of claim 1, wherein after the distribution step is completed, an unbalance detection step for detecting unbalance of fabrics is performed.

5. The method of claim 4, wherein, when fabrics are found unbalanced in the unbalance detection step, the distribution step is performed again.

6. The method of claim 4, wherein, when fabrics are found not unbalanced in the unbalance detection step, the dehydration step is performed.

* * * * *